March 22, 1932.  J. L. BROWNELL  1,850,741
METER CONTROL
Filed Dec. 26, 1930   3 Sheets-Sheet 3

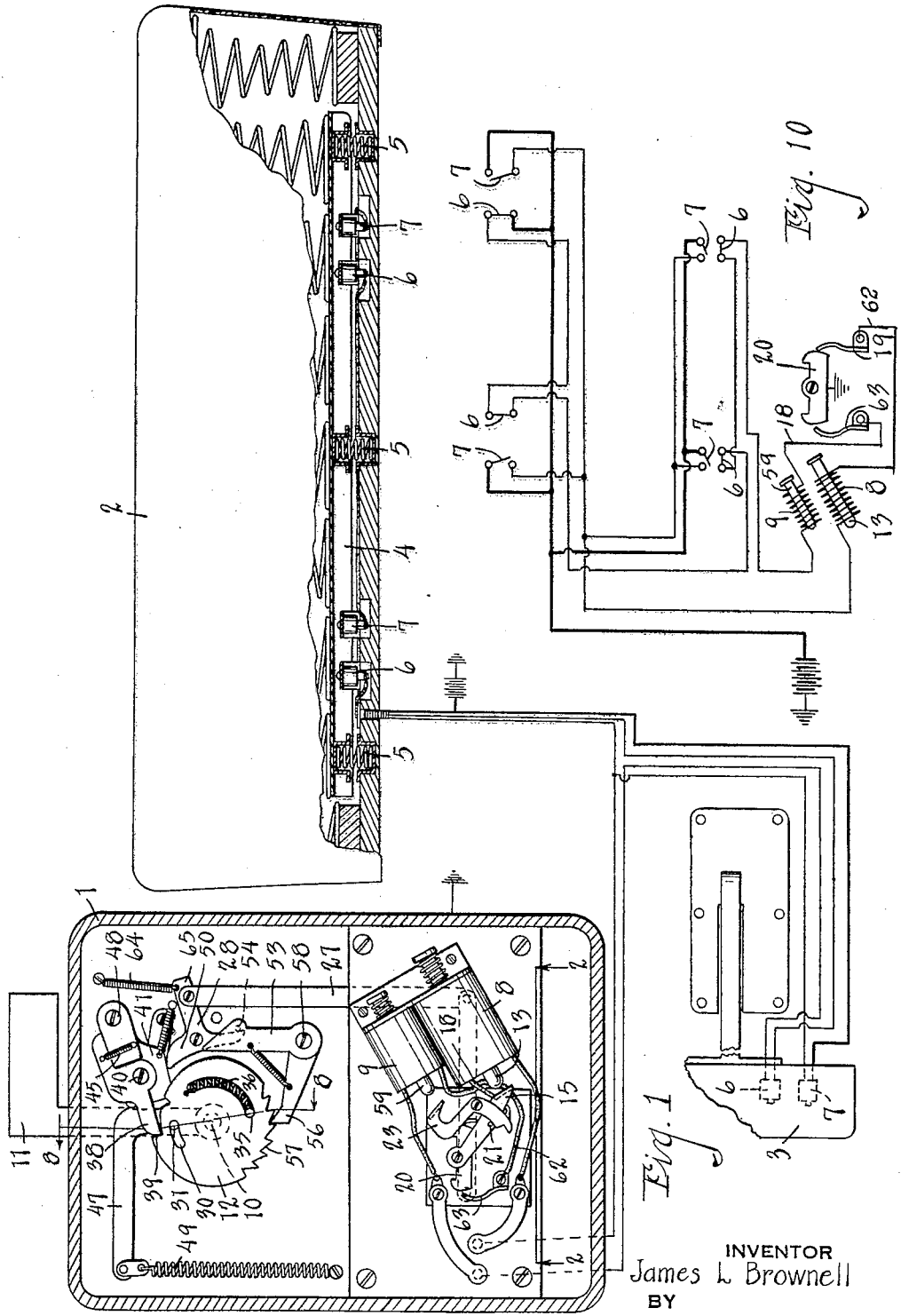

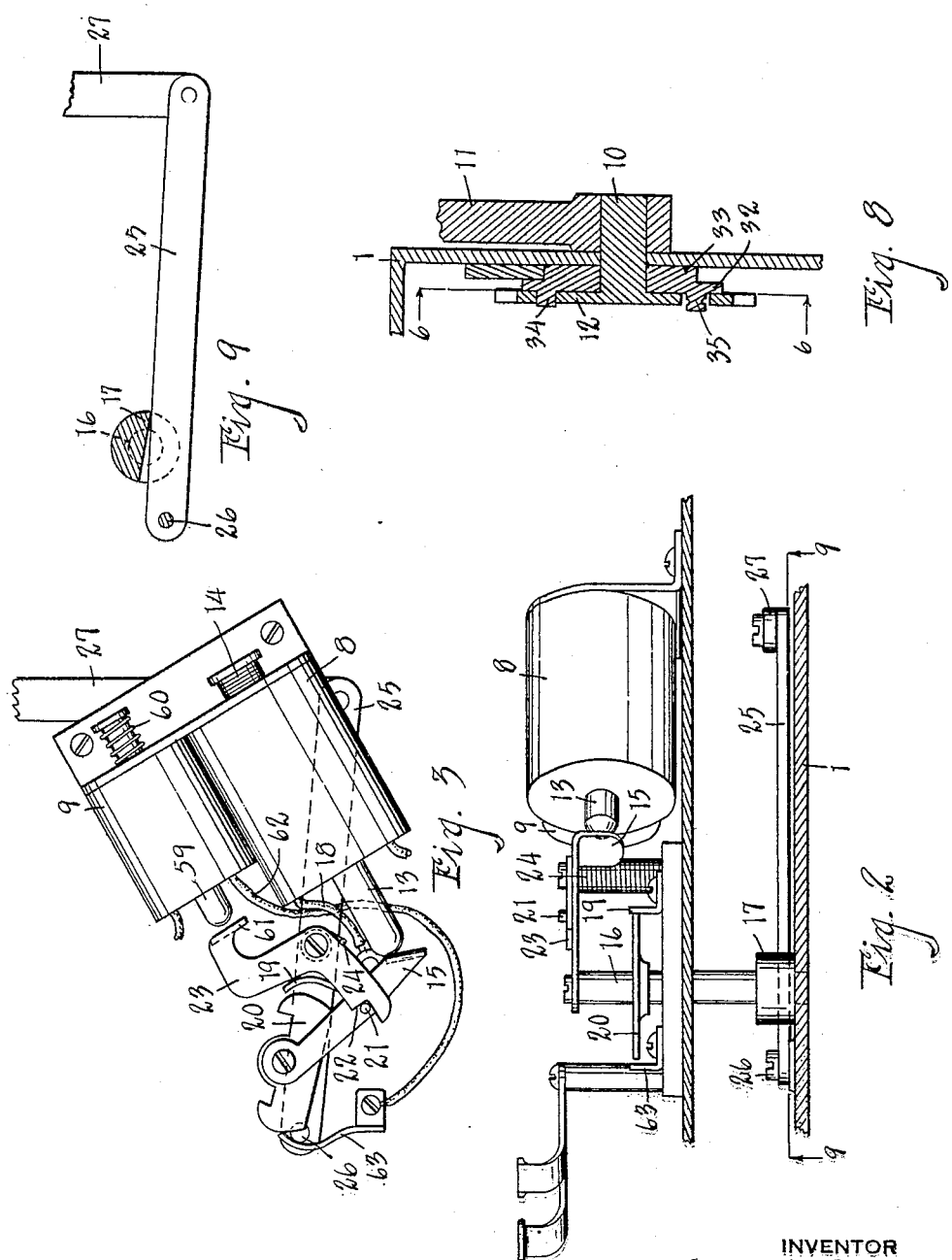

INVENTOR
James L. Brownell
BY
Chappell and Earl
ATTORNEYS

Patented Mar. 22, 1932

1,850,741

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

METER CONTROL

Application filed December 26, 1930. Serial No. 504,752.

The main objects of this invention are:

First, to provide a control apparatus for the meters of taxicabs by which the meter is automatically made operative when the passenger seats himself in the cab.

Second, to provide an apparatus of this character which will prevent the driver from carrying passengers without having the meter in registering position.

Third, to provide an apparatus of this character which will keep the driver from neglecting his duty by occupying the passenger compartment of the cab.

Fourth, to provide an apparatus of this character which will maintain the meter in recording position as long as the passenger seat is occupied even though the operator inadvertently fails to remove the meter from "time not recording" position after a forced stop during a trip when the meter should be recording.

Objects relating to details and economies of my invention will definitely appear from the description to follow. The invention is defined in the claims.

A structure which embodies the features of my invention is clearly illustrated in the accompanying drawings, in which:

Fig. 1 is a sectional view of the taxi-meter in non-registering position showing the means for setting the meter in registering position and electrical connections therefor from the rear seat of the vehicle which is partially broken away to more clearly illustrate the electrical switches, and a partial view of the auxiliary seat and its electrical connections.

Fig. 2 is a partial sectional view on line 2—2 of Fig. 1 with the wiring connections not shown.

Fig. 3 is a detail view of the electromagnets shown in Fig. 1 with the wiring connections.

Fig. 8 is a sectional view of the mechanism shown in Figs. 1 and 4 with certain parts omitted.

Fig. 9 is a sectional view on line 9—9 of Fig. 2.

Fig. 10 is a wiring diagram.

Figure 5:
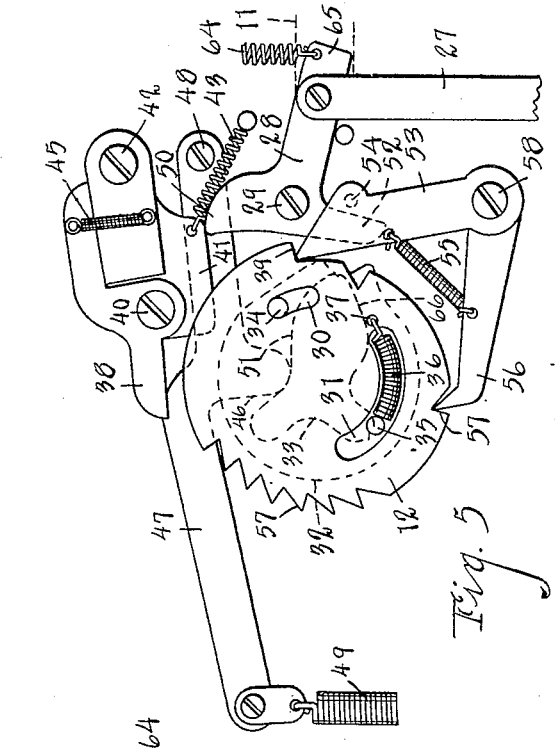
Fig. 5 is a detail view of the mechanism shown in Fig. 4 in registering position.

Referring to the drawings, 1 is a fare registering taxi-meter, 2 the rear seat cushion and 3 the auxiliary seat of a taxicab. The frame 4 for the cushion 2 is yieldingly supported by the coiled springs 5 to hold the seat out of engagement with the series switches 6 and the parallel switches 7 which are conventional so not shown in detail. The auxiliary seat 3 is also equipped with switches 6 and 7.

When the passenger is seated on the seat cushion 2 the frame 4 is forced downward closing the parallel switches 7 and energizing the electromagnet 8. When the passenger leaves the seat the springs 5 force the frame 4 upward closing the series switches 6 and energizing the electromagnet 9. The operation of the auxiliary seat 3 is identical.

The fare registering parts of the meter, which are conventional and not shown herein, are controlled by the shaft 10. On the outside of the meter attached to this shaft is a flag 11. The shaft 10 can be rotated by a disk 12 attached thereto.

When the electromagnet 8 is energized the plunger 13 with the spring return mechanism 14 is forced out as in Fig. 3. This forces the lever 15 to the position shown in Fig. 3. The lever 15 is attached to the shaft 16, which shaft is rotated by the lever.

On the opposite end of the shaft 16 is a cam 17, see Fig. 9. When the plunger 13 forces the lever 15 the cam 17 is turned to the position shown in Fig. 9.

The circuit through the electromagnet 8 is completed by grounding through wire 62 to the terminal 19 and switch 20 on shaft 16. When shaft 16 is rotated by movement of the lever 15 this connection is broken. The lever 15 is held in open position by the pin 21 thereon which engages with a stop 22 on bell crank 23 which is yieldingly urged into pin engaging position by a spring 24.

When the cam 17 is rotated by this movement the lever 25 pivoted at 26 is forced downward. Through the link 27 the bell crank 28 pivoted at 29 is operated.

The disk 12, which rotates shaft 10, is slotted as shown at 30 and 31. Directly adjacent the disk 12 is a cam member 32 with an additional cam surface 33 projecting from the side not adjacent to disk 12. This cam member 32 is loosely mounted for rotation on the shaft 10 and from the surface adjacent disk 12 are two projecting pins 34 and 35. The pin 34 registers with one slot 30 in disk 12 and pin 35 registers with the slot 31 in disk 12. A spring 36 is fastened to the pin 35 and to the disk 12 at 37.

Figure 4:
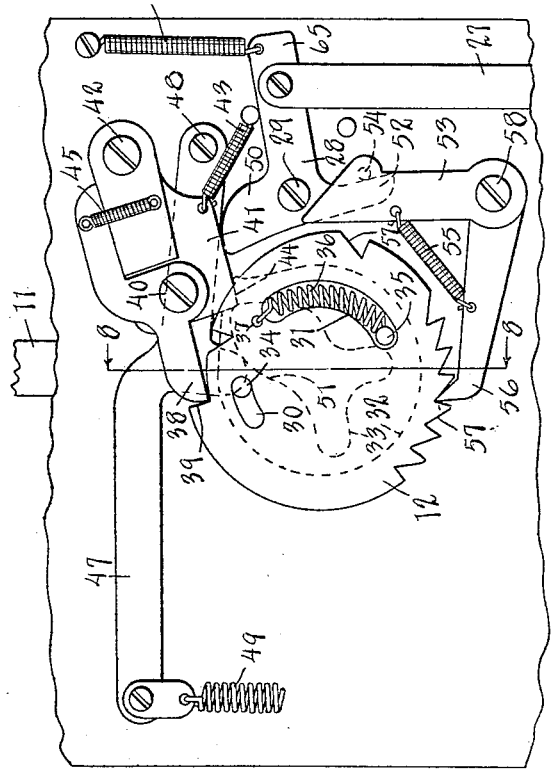
Fig. 4 is a detail view of the meter control mechanism in the initial or non-registering position.

In the position shown in Fig. 4 the cam member 32 is in such position that the spring 36 is tensioned to actuate the disk 12. The disk is held against this motion by the pawl 38 which engages the detent 39 in the periphery of the disk 12. The pawl 38 is pivoted at 40 to the pawl 41 which is pivoted at the point 42. The pawl 41 is held in position by a spring 43 and engages the detent 44 of cam member 32. The pawl 38 is held yieldingly in position by a spring 45. When the pawl 41 engages the detent 44 and the pawl 38 engages the detent 39, the spring 36 is flexed so that it tends to urge the disk 12 in a clockwise direction.

Figure 7:
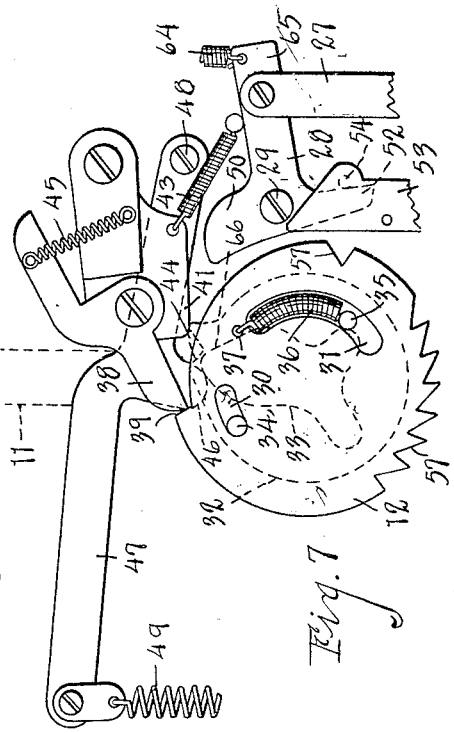
Fig. 7 is a detail of the mechanism shown in Fig. 4 showing the mechanism in process of resetting the mechanism that actuates the fare registering mechanism.

The cam surface 33 is engaged by a cam follower 46 on a lever 47 pivoted at 48 and held in contact with the cam surface 33 by a spring 49. When the bell crank lever 28 is operated through the electromagnet 8 and link 27, the pawl 41 is raised, but not out of engagement with the detent 44, by the arm 50 on the bell crank lever 28. The pawl 38 then rotates around the point 40 and the spring 36 moves disk 12 one-eighth of a turn or the length of the slot 30, which movement is limited by pin 34. As the disk 12 revolves, the pawl 38 remaining in engagement with the detent 39, is revolved further around the pivot 40, raising pawl 41 out of engagement with detent 44 on the cam member 32, Fig. 7. The pawl 41 is disengaged by a toggle action of these parts. As shown by Fig. 4, the pivot 40 is below a plane through detent 39 and pivot 42. In this position the pawl 41 is forced or locked by the pawl 38 into engagement with detent 44. However, when the arm 50 raises the pivot 40 above the plane through detent 39 and pivot 42, the lock is broken and the pawls are free to be turned by the disk 12, as pointed out above. The cam follower 46 then engages cam face 51 of the cam surface 33 and forces the cam member 32 and the disk 12 one quarter turn to set the fare registering parts of the meter into operative position.

When the bell crank lever 28 is rotated about the point 29, the arm 52 of the bell crank lever releases the lever 53 which in the first position is held by pin 54 which bears against arm 52. A spring 55 forces the lever 53 into contact with the surface of disk 12, and when the disk 12 has rotated one quarter turn and has set the fare registering parts of the meter in operative position, the lever 53 engages the detent 39 and prevents further movement of the shaft 10 either automatically or manually.

The spring 55 is attached to a pawl 56 which engages the surface of the disk 12 and in the quarter-turn position engages a detent 57 in the periphery of the disk 12 to prevent backward movement of the shaft 10. Levers 53 and 56 are pivoted at the point 58.

As long as the passenger remains on the seat 2 of the cab, the shaft 10 cannot be rotated to throw the fare registering parts of the meter out of operation. When the destination is reached, the shaft 10 cannot be turned by flag 11 to a non-registering position until the passenger leaves the seat. When the passenger's weight is removed from the seat, the switches 6 are closed, energizing the electromagnet 9. This forces the plunger 59, having spring return mechanism 60, into contact with the arm 61 of bell crank lever 23. This releases pin 21 from the stop 22 to allow lever 15 to assume the position shown in Fig. 1. The circuit through electromagnet 9 is grounded through wire 18, terminal 63 and switch 20.

When the lever 15 is released, the spring 64 through bell crank lever 28 and link 27 turns shaft 16 and switch 20 so that the contact is broken and the plunger 59 retracted, as shown in Figs. 1 and 4.

Figure 6:
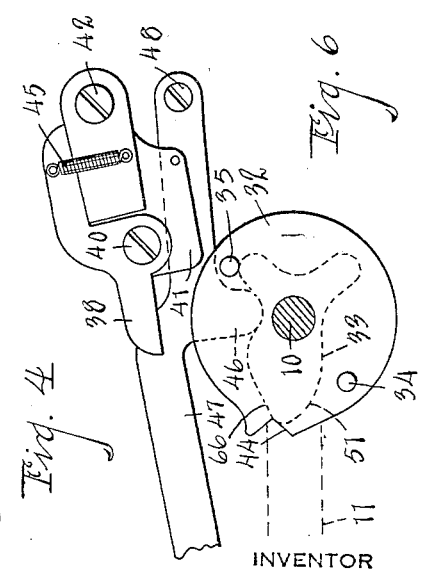
Fig. 6 is a sectional view of the meter control mechanism taken on line 6—6 of Fig. 8.

The arm 52 of the bell crank 28 engages a pin 54 of lever 53 and releases it from detent 39 in disk 12. This allows manual operation of the flag 11 to turn the meter to the position shown in Figs. 1 and 4. When by manual operation the shaft 10 has rotated to the position illustrated in Fig. 6, the face 66 of the cam 33 is in engagement with the cam follower 46. As the manual rotation continues, the cam surface 33 forces the lever 47 upward, increasing the tension on spring 49 until the cam follower 46 is past the point of the lift or dead center of the cam surface 33.

At this point the pawl 38 engages the detent 39 in the disk 12, thereby preventing further rotation of the flag. The cam follower 46 engaging the face 51 of cam surface 33 forces the cam disk 32 on to a further one-eighth turn or a distance equal to the length of slot 30. During this operation the pawl 41 engages the periphery of cam member 32 and comes to rest in detent 44, thus preventing further movement of the cam member 32. The spring 36 is tensioned by this movement and the springs 43 and 45 return the pawls 38 and 41 to the position shown in Fig. 4, thus re-setting the mechanism.

I have illustrated and described my invention in an embodiment which I have found highly satisfactory. I have not attempted to illustrate or describe other modifications or adaptations which I contemplate as it is believed this disclosure will enable anyone skilled in the art to which this invention relates to embody or adapt the same as may be desired.

Having thus described my invention, what I claim as new and desire to secure by Letters Patent is:

1. In a motor vehicle, a fare registering meter having a shaft for controlling the fare registering parts thereof, a disk mounted on said shaft for rotating the same, a cam member loosely mounted for rotation on said shaft, a cam follower to force said cam member in the direction of rotation of said shaft, a spring connecting said cam member and said disk to urge the disk in the direction of rotation of said cam member, a pawl for holding said cam member in initial position, a second pawl pivoted on said cam member holding pawl for holding said first disk in initial position, an electro-magnet operated by the seat of the vehicle to release said pawls to set the fare registering mechanism into operative position, a pawl for stopping and holding said disk in the registering position, a second electromagnet operated by the seat of the vehicle for releasing said last named holding pawl, and a hand lever on said shaft for completing the rotation of said shaft and re-setting the mechanism.

2. In a motor vehicle, a fare registering meter having a shaft for controlling the fare registering parts thereof, a disk on said shaft for rotating the same, a cam member loosely mounted for rotation on said shaft and adjacent said disk, a cam follower for rotating said cam member in the direction of rotation of said shaft, a spring connecting said cam member and said disk to urge rotation of said disk in the direction of rotation of said cam member, a pin on said cam member registering with a slot in said disk for limiting rotation of said cam member independently of said disk, a pawl for holding said cam member in initial position, a second pawl pivoted on said cam member holding pawl for holding said first disk in initial position, an electromagnet operated by the seat of the vehicle to release said pawls to set the fare registering mechanism into operative position, a pawl for stopping and holding said disk in the registering position, a second electromagnet operated by the seat of the vehicle for releasing said last named holding pawl, and means for completing the rotation of said shaft and resetting the mechanism.

3. In a motor vehicle, a fare registering meter having a shaft for controlling the fare registering parts thereof, a disk on said shaft for rotating the same, a cam member loosely mounted for rotation on said shaft and adjacent said disk, a cam follower for rotating said cam member in the direction of rotation of said shaft, a spring connecting said cam member and said disk to urge rotation of said disk in the direction of rotation of said cam member, means for limiting rotation of said cam member independently of said disk, a pawl for holding said cam member in initial position, a second pawl pivoted on said cam member holding pawl for holding said first disk in initial position, an electromagnet operated by the seat of the vehicle to release said pawls to set the fare registering mechanism into operative position, a pawl for stopping and holding said disk in the registering position, a second electromagnet operated by the seat of the vehicle for releasing said last named holding pawl, and means for completing the rotation of said shaft and resetting the mechanism.

4. In a motor vehicle, a fare registering meter having a shaft for controlling the fare registering parts thereof, a disk on said shaft for rotating the same, a cam member loosely mounted for rotation on said shaft and adjacent said disk, a lost motion connection between said cam member and said disk, a cam follower for rotating said cam member in the direction of rotation of said shaft, a spring connecting said cam member and said disk to urge rotation of said disk in the direction of rotation of said cam member, means for limiting rotation of said cam member independently of said disk, a pawl for holding said cam member in initial position, a second pawl pivoted on said cam member holding pawl for holding said first disk in initial position, an electromagnet operated by the seat of the vehicle to release said pawls to set the fare recording mechanism into operative position, a pawl for stopping and holding said disk in the registering position, a second electromagnet operated by the seat of the vehicle for releasing said last named holding pawl, and means for completing the rotation of said shaft and re-setting the mechanism.

5. In a motor vehicle, a fare registering meter having a shaft for controlling the fare registering parts thereof, a disk on said shaft for rotating the same, a cam member loosely mounted for rotation on said shaft and adjacent said disk, a cam follower for rotating said cam member in the direction of rotation of said shaft, a spring connecting said cam member and said disk to urge rotation of said disk in the direction of rotation of said cam member, means for limiting rotation of said cam member independently of said disk, a pawl for holding said cam member in initial position, a second pawl for holding said first disk in initial position, an electromagnet operated by the seat of the vehicle to release said pawls to set the fare registering mechanism into operative position, a pawl for stopping and holding said disk in the registering position, a second electromagnet operated by the seat of the vehicle for releasing said last named holding pawl, and means for completing the rotation of said shaft and re-setting the mechanism.

6. In a motor vehicle, a fare registering meter having a shaft for controlling the fare registering parts thereof, a disk on said shaft for rotating the same, a cam member loosely mounted for rotation on said shaft and adjacent said disk, a cam follower for rotating said cam member in the direction of the rotation of said shaft, a spring connecting said cam member and said disk to urge rotation of said disk in the direction of rotation of said cam member, means for limiting rotation of said cam member independently of said disk, a pawl for holding said first disk in initial position pivoted on a pawl for holding said cam member in initial position, said pawls coacting to form a toggle, an electromagnet operated by the seat of the vehicle to actuate said toggle and release said disk and cam member to set the fare registering mechanism into operative position, a pawl for stopping and holding said disk in the registering position, a second electromagnet operated by the seat of the vehicle for releasing said last named holding pawl, and means for completing the rotation of said shaft and re-setting the mechanism.

7. In a motor vehicle, a fare registering meter having a shaft for controlling the fare registering parts thereof, a disk on said shaft for rotating the same, spring actuated means for rotating said disk, a pawl operating on said disk for holding said disk in initial position, an electromagnet operated by the seat of the vehicle for releasing said pawl, a second pawl operating on said disk for holding the same in fare registering position, a second electromagnet operated from the seat of the vehicle to release said second pawl, and means for turning said shaft to a fare not registering position and to re-set said spring means.

In witness whereof I have hereunto set my hand.

JAMES L. BROWNELL.